March 9, 1954     W. WIEST ET AL     2,671,370
LATHE CENTER
Filed July 19, 1951

INVENTORS:
WILHELM WIEST AND
ERICH SCHIPS
BY:

Patented Mar. 9, 1954

2,671,370

UNITED STATES PATENT OFFICE 2,671,370

LATHE CENTER

Wilhelm Wiest, Plochingen, and Erich Schips,
Stuttgart, Germany

Application July 19, 1951, Serial No. 237,578
Claims priority, application Germany
July 20, 1950

11 Claims. (Cl. 82—33)

The invention relates to a lathe center and more particularly to a spring-presesd lathe center supported by a sleeve and surrounded by a driving member which is axially displaceable with respect to the sleeve and said lathe center and which by its displacement acts on intermediate members, thereby limiting the inward movement of the spindle of the center pin.

The use of lathe centers of the general character described is well known, but all such constructions are either complicated and expensive, or they have other disadvantages, such as inaccurate positioning of the work, because of the more or less ample clearance of this kind of spindle mountings.

It is accordingly the main object of this invention to provide a lathe center of the character indicated which is relatively simple and inexpensive in construction.

Another object of this invention is to restrain the center pin from oscillating within the sleeve, by providing clamping springs which act on two spaced parts of the spindle of the center pin.

Yet another object of this invention is to provide an annular member movable on the spindle of the center pin with a ball-like outer surface thereby allowing the driving member supported by said ball-like outer surface to be automatically adjustable to work faces which are not perpendicular to the axis of the work.

Figure 1:
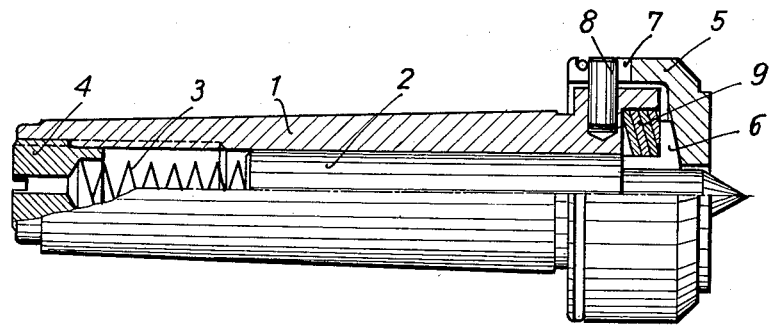
Figure 3:
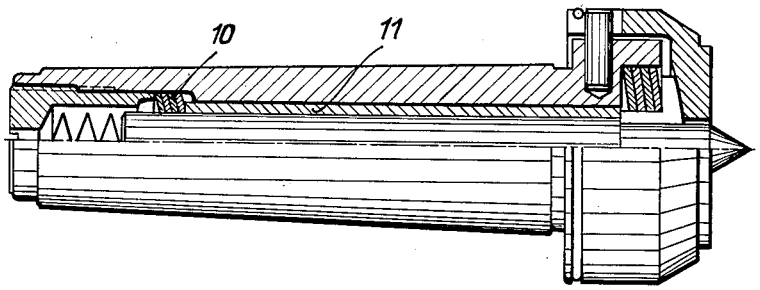
Figure 2:
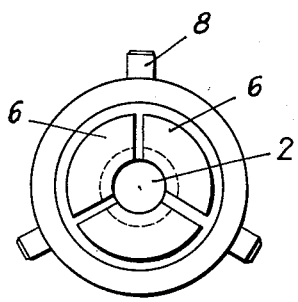
Figure 4:
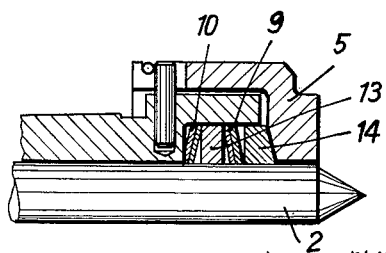

Embodiments of the invention are hereinafter more fully described, reference being made to the accompanying drawings, wherein like numerals refer to like parts throughout and in which Fig. 1 is a partly sectional side view of the device, Fig. 2 is a front view of the same, the driving member being removed, Fig. 3 is a partly sectional side view of a modified embodiment of the invention with two clamping spots located at the fore end and posterior end of the spindle of the center pin, respectively, and Fig. 4 is a fragmentary view in a longitudinal section of a still further modified form of lathe center, with two clamping spots located both at the fore end of the spindle of the center pin.

Referring to the drawings, I indicates a sleeve, in which is mounted a spindle of a center pin 2 so as to be axially displaceable in said sleeve, said spindle being forced towards the work to be centered and gripped by a spring 3 bearing against a screw 4. The spherically shaped convex inner surface of the trough-like driving member 5, the outersurface of which is roughened, is adjacent to the ball-like outer surface of the triple slotted clamping bush 6, the arrangement being such that the driving member is oscillatingly supported by the clamping bush 6, being therefore automatically adjustable to work faces which are not perpendicular to the longitudinal axis of the work. Screws 8 on the sleeve I engage slots 7, provided on the driving member 5, securing the latter against rotating with respect to the sleeve I.

A recess provided in the front part of the sleeve I takes up the clamping springs which in the above described construction are plate springs.

The operation of the device is as follows:

On clamping the work with the aid of the tailstock, the center pin 2 is moved rearwardly until the face of the work is bearing against the driving member 5. Further displacement of the tailstock causes now the driving member 5 and the clamping bush 6 to act on the springs 9, thereby diminishing their interior diameter. By so acting, the resilient parts of the clamping bush 6 press against the spindle of the center pin 2, the latter being thus held in its respective position.

Fig. 3 illustrates another embodiment of the invention, additional clamping springs 10 being provided at the rear end of the center pin 2. When the driving member 5 is moving rearwardly, it acts on the clamping bush 6 and the pressure transmitting sleeve 11 and thereby causes the springs 10 bearing directly against the spindle of the center pin 2 to become effective simultaneously with the springs 9.

In the embodiment of the invention as shown in Fig. 4 the driving member 5 imparts motion to the ring 14 movable on the spindle of the center pin 2, said ring acting in turn on the clamping springs 9. Additional clamping springs 10 are provided in close vicinity to the clamping springs 9. An axially movable distance ring 13 is arranged also between the two clamping spots of the springs 9 and 10 which bear directly against the spindle of the center pin 2.

In the embodiments as shown in Figs. 3 and 4 any oscillatory movement of the spindle of the center pin 2 within the sleeve I is prevented, the spindle being supported at two points.

Instead of the plate springs used in connection with the above described embodiments of the invention, there may be also used other ring springs, such as form springs or friction ring springs.

As many changes could be made in the above constructions without departing from the scope of the invention, it is intended that all matter contained in the above description or shown in the accompanying drawings shall be interpreted as illustrative and not in a limiting sense.

Having thus described the invention, what we claim as new and desire to secure by Letters Patent, is:

1. A lathe center apparatus, comprising, in combination, an elongated hollow sleeve having front and rear ends and a central axis and having adjacent said front end thereof a wall portion extending transversely to said central axis thereof; an elongated center pin slidably mounted in said sleeve for movement along the axis thereof and having an operating end portion extending beyond said front end of said sleeve; an annular driving head located with clearance about said operating end portion of said center pin and being mounted on said front end of said sleeve for axial movement therealong; an annular, dish-shaped plate of springy material located about said center pin adjacent said front end of said sleeve and having an inner annular edge portion located adjacent said center pin and an outer annular edge portion, one of said annular edge portions of said plate being located against said wall portion of said sleeve to prevent movement of said one annular edge portion of said plate toward said rear end of said sleeve; and motion transmitting means located between said driving head and the other of said annular edge portions of said plate for transmitting movement of said driving head toward said rear end of said sleeve to said other annular edge portion of said plate to tend to flatten the latter so as to reduce the size of said inner annular edge portion of said plate for clamping said center pin.

2. A lathe center apparatus, comprising, in combination, an elongated hollow sleeve having front and rear ends and a central axis and having adjacent said front end thereof a wall portion extending transversely to said central axis thereof; an elongated center pin slidably mounted in said sleeve for movement along the axis thereof and having an operating end portion extending beyond said front end of said sleeve; an annular driving head located with clearance about said operating end portion of said center pin and being mounted on said front end of said sleeve for axial movement therealong; an annular, dish-shaped plate of springy material located about said center pin adjacent said front end of said sleeve and having an inner annular edge portion located adjacent said center pin and an outer annular edge portion located next to said sleeve on the interior thereof, one of said annular edge portions of said plate being located against said wall portion of said sleeve to prevent movement of said one annular edge portion of said plate toward said rear end of said sleeve; and motion transmitting means located between said driving head and the other of said annular edge portions of said plate for transmitting movement of said driving head toward said rear end of said sleeve to said other annular edge portion of said plate to tend to flatten the latter so as to reduce the size of said inner annular edge portion of said plate for clamping said center pin and so as to increase the size of said outer annular edge portion of said plate for clamping the latter to said sleeve.

3. A lathe center apparatus, comprising, in combination, an elongated hollow sleeve having front and rear ends and a central axis and having adjacent said front end thereof a wall portion extending transversely to said central axis thereof; an elongated center pin slidably mounted in said sleeve for movement along the axis thereof and having an operating end portion extending beyond said front end of said sleeve; an annular driving head located with clearance about said operating end portion of said center pin and being mounted on said front end of said sleeve for axial movement therealong; an annular, dish-shaped plate of springy material located about said center pin adjacent said front end of said sleeve and having an inner annular edge portion located adjacent said center pin and an outer annular edge portion located next to said sleeve on the interior thereof, one of said annular edge portions of said plate being located against said wall portion of said sleeve to prevent movement of said one annular edge portion of said plate toward said rear end of said sleeve; motion transmitting means located between said driving head and the other of said annular edge portions of said plate for transmitting movement of said driving head toward said rear end of said sleeve to said other annular edge portion of said plate to tend to flatten the latter so as to reduce the size of said inner annular edge portion of said plate for clamping said center pin and so as to increase the size of said outer annular edge portion of said plate for clamping the latter to said sleeve; and spring means located in said sleeve and being operatively connected to said center pin for urging said operating end thereof outwardly from said sleeve.

4. A lathe center apparatus, comprising, in combination, an elongated hollow sleeve having front and rear ends and a central axis and having adjacent said front end thereof a wall portion extending transversely to said central axis thereof; an elongated center pin slidably mounted in said sleeve for movement along the axis thereof and having an operating end portion extending beyond said front end of said sleeve; an annular driving head located with clearance about said operating end portion of said center pin and being mounted on said front end of said sleeve for axial movement therealong, said driving head having an inner surface portion located about said center pin, facing said front end of said sleeve, and being spherically shaped; an annular, dish-shaped plate of springy material located about said center pin adjacent said front end of said sleeve and having an inner annular edge portion located adjacent said center pin and an outer annular edge portion, one of said annular edge portions of said plate being located against said wall portion of said sleeve to prevent movement of said one annular edge portion of said plate toward said rear end of said sleeve; and motion transmitting means located between said driving head and the other of said annular edge portions of said plate for transmitting movement of said driving head toward said rear end of said sleeve to said other annular edge portion of said plate to tend to flatten the latter so as to reduce the size of said inner annular edge portion of said plate for clamping said center pin, said motion transmitting means including an annular member located about said center pin and having a spherically shaped side surface engaging and mating with said spherically shaped inner surface portion of said guiding head so that the latter is tiltable about said sleeve axis.

5. A lathe center apparatus, comprising, in combination, an elongated hollow sleeve having front and rear ends and a central axis and having adjacent said front end thereof a wall portion extending transversely to said central axis thereof; an elongated center pin slidably mounted in said sleeve for movement along the axis thereof and having an operating end portion extending beyond said front end of said sleeve; an annular driving head located with clearance about said operating end portion of said center pin and being mounted on said front end of said sleeve for axial movement therealong; an annular, dish-shaped plate of springy material located about said center pin adjacent said front end of said sleeve and having an inner annular edge portion located adjacent said center pin and an outer annular edge portion, one of said annular edge portions of said plate being located against said wall portion of said sleeve to prevent movement of said one annular edge portion of said plate toward said rear end of said sleeve; motion transmitting means located between said driving head and the other of said annular edge portions of said plate for transmitting movement of said driving head toward said rear end of said sleeve to said other annular edge portion of said plate to tend to flatten the latter so as to reduce the size of said inner annular edge portion of said plate for clamping said center pin; and a collet located about said centerpin between the latter and said inner annular edge portion of said plate for transmitting the clamping force thereof to said center pin.

6. A lathe center apparatus, comprising, in combination, an elongated sleeve having a central axis, front and rear ends, and an inner portion of enlarged diameter at said front end thereof forming adjacent said front end a wall extending transversely to said central axis; an elongated center pin slidably mounted in said sleeve for movement along said axis thereof and having a front end portion extending beyond said front end of said sleeve; spring means located in said sleeve adjacent said rear end thereof and engaging said pin to urge said front end portion thereof outwardly of said sleeve; a plurality of nested, dish-shaped, annular, springy plates located within said enlarged inner portion of said sleeve and each having an inner, annular edge portion located adjacent said pin and an outer annular edge portion located next to said sleeve at said enlarged inner portion thereof, one of said annular edge portions of the plate nearest said transverse wall of said sleeve engaging said wall; an annular driving head located about said front end portion of said pin and being mounted on said front end of said sleeve for axial movement therealong; and motion transmitting means located between said driving head and said plates for tending to flatten the latter when said driving head moves toward said rear end of said sleeve.

7. A lathe center apparatus, comprising, in combination, an elongated sleeve having front and rear ends and a central axis and having at said front end thereof an inner portion of larger diameter than the remainder of said sleeves to form in said sleeve, adjacent said front end thereof, a wall portion extending transversely to said central axis; a center pin slidably mounted in said sleeve for movement along the axis thereof, having a front end extending beyond said front end of said sleeve, and being spaced from said front inner portion of said sleeve; a first group of nested, dish-shaped, springy plates located about said center pin within said front inner portion of said sleeve and against said transverse wall portion thereof, said plates each having an inner annular edge portion located next to said center pin and an outer annular edge portion located next to said sleeve, and said first group of plates each having a concave side facing said front end of said center pin; a first rigid, annular member located about said center pin in said front, inner portion of said sleeve and against said first group of plates; a second group of plates, identical with said first group of plates, located about said center pin within said front inner portion of said sleeve and against said first, rigid annular member, on the opposite side thereof from said first group of plates, said second group of plates having a convex side facing said front end of said center pin; a second, rigid annular member located about said center pin and against said second group of plates on the opposite side thereof from said first, rigid annular member; and an annular driving head located with clearance about said front end of said center pin and being mounted on said front end of said sleeve for axial movement therealong, said driving head engaging said second rigid annular member on the opposite side thereof from said second group of plates so that when said driving head is moved toward said rear end of said sleeve said first and second groups of plates will tend to flatten so as to engage said center pin and said sleeve at points located in planes normal to said sleeve axis and spaced from each other.

8. A lathe center apparatus, comprising, in combination, an elongated sleeve having front and rear ends and a central axis and having at said front end thereof an inner portion of larger diameter than the remainder of said sleeves to form in said sleeve, adjacent said front end thereof, a wall portion extending transversely to said central axis; a center pin slidably mounted in said sleeve for movement along the axis thereof, having a front end extending beyond said front end of said sleeve, and being spaced from said front inner portion of said sleeve; a first group of nested, dish-shaped, springy plates located about said center pin within said front inner portion of said sleeve and against said transverse wall portion thereof, said plates each having an inner annular edge portion located next to said center pin and an outer annular edge portion located next to said sleeve, and said first group of plates each having a concave side facing said front end of said center pin; a first rigid, annular member located about said center pin in said front, inner portion of said sleeve and against said first group of plates; a second group of plates, identical with said first group of plates, located about said center pin within said front inner portion of said sleeve and against said first, rigid annular member, on the opposite side thereof from said first group of plates, said second group of plates having a convex side facing said front end of said center pin; a second, rigid annular member located about said center pin and against said second group of plates on the opposite side thereof from said first, rigid annular member, said second rigid annular member having a spherical side facing said front end of said center pin; and an annular driving head located with clearance about said front end of said center pin and being mounted on said front end of said sleeve for axial movement therealong, said driving head engaging said second rigid annular member on the opposite side thereof from said second group of plates so that when said driving head is moved toward said rear end of said sleeve said first and second groups of plates will tend to flatten so as to engage said center pin and said sleeve at points located in planes normal to said sleeve axis and spaced from each other, said driving head having an inner spherical side surface mating with said spherical side of said second rigid annular member so that said driving head is tiltable about said sleeve axis.

9. A lathe center, comprising, in combination, an elongated sleeve having a central axis and having front and rear ends, said sleeve having adjacent said front end thereof a wall portion extending transversely to said central axis; an elongated center pin slidably mounted in said sleeve and having a front end extending beyond said front end of said sleeve; a collet located about said center pin at said front end of said sleeve; a plurality of dish-shaped, nested, annular, springy plates located about said collet and against said wall portion of said sleeve, said plates each having a convex side facing said front end of said pin; and an annular driving head mounted with clearance about said front end of said center pin and on said front end of said sleeve for movement toward the rear end thereof so as to transmit movement to said collet for tending to flatten said plates to clamp said pin through said collet.

10. A lathe center, comprising, in combination, an elongated sleeve having a central axis and having front and rear ends, said sleeve having in the interior thereof and adjacent said front end thereof a wall portion extending transversely to said central axis; an elongated center pin slidably mounted in said sleeve and having a front end extending beyond said front end of said sleeve; a collet located about said center pin at said front end of said sleeve; a plurality of dish-shaped, nested, annular, springy plates located about said collet and against said wall portion of said sleeve, said plates each having a convex side facing said front end of said pin, an inner annular edge portion next to said collet, and an outer annular edge portion next to said sleeve; and an annular driving head mounted with clearance about said front end of said center pin and on said front end of said sleeve for movement toward the rear end thereof so as to transmit movement to said collet for tending to flatten said plates to clamp said pin through said collet, said inner annular edge portions of said plates engaging said collet and said outer annular edge portions of said plates engaging said sleeve when said driving head is moved toward the rear end of said sleeve.

11. A lathe center, comprising, in combination, an elongated sleeve having a central axis, a front end and a rear end, and in the interior of said sleeve adjacent said front end thereof a wall portion extending transversely to said central axis; an elongated tube located in said sleeve for sliding movement along the axis thereof; an elongated center pin, longer than said tube, located within the same for sliding movement along said central axis, said center pin having a rear end portion extending beyond said tube and a front end portion extending beyond said sleeve; a collet located on said front end portion of said center pin partly within said sleeve and in engagement with said tube; a first group of annular, nested, dish-shaped, springy plates located against said wall portion of said sleeve in the interior of the latter and in engagement therewith, said first group of plates each having a convex side facing said front end of said pin and an inner annular edge portion located next to said collet; a second group of annular, dish-shaped, nested, springy plates located about said rear end portion of said center pin beyond said tube and next to said sleeve, said second group of plates each having a convex side facing said front end of said pin and an inner annular edge portion located next to said pin; a plug member threadedly mounted in said rear end of said sleeve and engaging said second group of plates; and an annular driving head located with clearance about said front end of said center pin and being movably mounted on said front end of said sleeve for axial movement therealong, said driving head engaging said collet to move the latter toward said rear end of said sleeve when said driving head is moved toward said rear end of said sleeve so as to thereby transmit the movement of said driving head through said collet to said tube and to said first and second groups of plates for tending to flatten the latter so as to engage said sleeve and center pin and clamp the latter adjacent the front and rear ends thereof, respectively.

WILHELM WIEST.
ERICH SCHIPS.

References Cited in the file of this patent

UNITED STATES PATENTS

| Number | Name | Date |
|---|---|---|
| 1,829,619 | Svenson | Oct. 27, 1931 |

FOREIGN PATENTS

| Number | Country | Date |
|---|---|---|
| 227,206 | Switzerland | May 24, 1942 |
| 511,975 | Great Britain | Aug. 28, 1939 |